United States Patent [19]

Miller et al.

[11] Patent Number: 5,571,542
[45] Date of Patent: Nov. 5, 1996

[54] METHOD OF MAKING AN ANIMAL FEED HAVING A STABLE SUSPENSION OF PSYLLIUM

[75] Inventors: Bill L. Miller; Robert DeGregorio, both of Fort Dodge, Iowa

[73] Assignee: Land O'Lakes, Inc., Arden Hills, Minn.

[21] Appl. No.: 425,478

[22] Filed: Apr. 20, 1995

[51] Int. Cl.$^6$ .................................................. A23K 1/14
[52] U.S. Cl. ............................ 426/2; 426/630; 426/635
[58] Field of Search ............................... 426/2, 630, 635

[56] References Cited

U.S. PATENT DOCUMENTS

| 4,800,088 | 1/1989 | Sawhill | 426/69 |
|---|---|---|---|
| 5,234,687 | 8/1993 | Barbera et al. | 424/195.1 |

FOREIGN PATENT DOCUMENTS

WO82/02650  8/1982  WIPO.

OTHER PUBLICATIONS

"Potential Benefits of Psyllium Mucilloid Supplementation of Oral Replacement Formulas for Neonatal Calf Scours", Martin J. Fettman, DVM, MS, Ph.D., The Compendium, North American Edition, vol. 14, No. 2, Feb. 1992, pp. 247–255.

*Primary Examiner*—Esther Kepplinger
*Assistant Examiner*—Choon P. Koh
*Attorney, Agent, or Firm*—Kinney & Lange, P.A.

[57] ABSTRACT

The present invention includes a method of making an animal feed having a stable suspension of psyllium. The method includes the step of mixing an effective amount of a psyllium composition, an animal feed composition, and water to form an animal feed solution. The psyllium composition remains in suspension for greater than 5 minutes.

16 Claims, No Drawings

METHOD OF MAKING AN ANIMAL FEED HAVING A STABLE SUSPENSION OF PSYLLIUM

BACKGROUND OF THE INVENTION

The present invention relates generally to a method of making an animal feed that contains psyllium. More particularly, the present invention relates to a method of incorporating a psyllium composition into animal feed so that the psyllium composition forms a stable suspension in the animal feed.

Animals that are bred to produce products for human consumption undergo several distinct stages in their development. The care that the animals receive during each of these stages plays an important role in determining the amount and quality of the products produced by the animals. For example, when breeding cows for dairy purposes, the age at which the cows freshen as well as the quantity of milk produced after freshening depend upon the amount and type of feed that the cows consume prior to freshening.

One of the most important pre-freshening stages is prior to weaning. During this stage calves grow rapidly despite the fact that their four-compartment stomach is undeveloped when compared to the stomach of mature cows. As a result of the undeveloped stomach, calves are limited to consumption of nutrients in liquid form. These nutrients are primarily fed to calves in the form of milk.

As an alternative to feeding calves saleable milk, numerous milk replacer compositions have been developed. The milk replacer compositions are prepared from dairy and non-dairy sources that are combined to provide nutrient and palatability characteristics that are similar to milk.

Protein is one of the nutrients that is particularly important in the development of young, rapidly growing calves. In spite of the importance of protein in the calves' diet, it is desirable to minimize the protein concentration in animal feed because protein supplements are usually more expensive than other components in the animal feed.

As used herein, the term "protein supplement" refers to those feed components that have crude protein concentration of greater than 20 percent. The selection of a protein supplement is affected by several considerations. One of the principal considerations is the availability and cost of the protein supplement in the area. Many protein supplements are available in limited supply in some localities, while other protein supplements are available on a nationwide or worldwide basis. Protein supplements employed in milk replacer are primarily selected from the following sources: milk by-products, oil seed meals, other plant sources, and animal meat or blood component by-products.

The milk replacers are typically marketed in a powdered form to reduce the costs associated with distributing liquified milk replacer. The powdered milk replacer is mixed with water prior to use. The formulation and feeding of milk replacers is known in the art.

It has been suggested that adding psyllium to milk replacer may be effective in reducing scours in calves. Martin J. Fettman, *Potential Benefits of Psyllium Mycelioid Supplementation of Replacement Formulas for Neonatal Calves Scours,* COMPENDIUM NORTH AMERICAN ED., February 1992, at 247 (Fettman article). The Fettman article based this opinion upon the properties of psyllium as well as the effectiveness of psyllium in reducing intestinal disorders in other animals and humans.

The use of a Plantago seed supplement in animal feed is also disclosed in yon Magius, PCT Application No. WO82/02650 (von Magius patent). The von Magius patent describes using the Plantago seed supplement to reduce animal stress conditions, prevent or treat scours, and promote growth.

SUMMARY OF THE INVENTION

The present invention includes a method of making an animal feed having a stable suspension of psyllium. The method includes the step of mixing a psyllium composition, an animal feed composition, and water to form an animal feed solution. The psyllium composition remains in suspension for greater than 5 minutes.

DETAILED DESCRIPTION OF THE PREFERRED EMBODIMENTS

The method of the present invention includes feeding a ruminant an animal feed mixture that contains an effective amount of a psyllium composition. It has surprisingly been found that the psyllium composition remains in suspension for greater than 5 minutes.

It has also been found that the animal feed mixture exhibits a protein sparing effect when the psyllium composition is added to an animal feed composition. The term "protein sparing effect" means that the ruminant experiences a greater weight gain per unit of protein that is consumed. By ruminant is meant both mature and young animals of the suborder ruminantia.

The animal feed composition is preferably a milk replacer composition. As noted above, numerous milk replacer compositions have been developed to provide an alternative to feeding commercially saleable milk to calves.

The psyllium composition contains psyllium, a non-digestible, soluble fiber that has been used for laxative properties in human and veterinary medicine. Preferably, the psyllium is in the form of psyllium mucilloid that is obtained from ispaghula husks.

The psyllium composition as used in the present invention has a purity of less than 90 percent by weight and preferably between approximately 84 and 86 percent by weight. As used herein, the term "purity" means the concentration of psyllium in the psyllium composition. In addition to psyllium, the psyllium composition also contains less than approximately 15 percent by weight light extraneous matter and less than approximately 1 percent by weight heavy extraneous matter. Light extraneous matter is fibrous material associated with the seed husk. Heavy extraneous matter is comprised of seed fragments and soil.

The psyllium composition is ground to a fine particle size. As used herein, the term "fine particle size" means that less than 10 percent of the psyllium composition is retained on a 60 mesh screen and 0 percent is retained on a 20 mesh screen (ASTM E-11-61). A psyllium composition possessing the above characteristics can be obtained from PS Fiber, Inc. of Muncie, Ind.

The animal feed mixture is prepared by mixing an effective amount of the psyllium composition into the animal feed composition. As used herein, the term "effective amount of the psyllium composition" means a concentration of the psyllium composition that causes a protein sparing effect when tile animal feed mixture is consumed by the ruminant. The psyllium composition concentration in the animal feed mixture is less than approximately 4.4 percent by weight and preferably between approximately 0.5 and 2.2 percent by weight of the animal feed composition. It has been found that using the psyllium composition in the above concentration range provides desirable results in a cost-effective manner.

The psyllium composition of the present invention provides optimum results when mixed with the animal feed composition while the animal feed composition is in a dry form. Mixing the psyllium composition with the animal feed composition while the animal feed composition is in a dry form simplifies the distribution and use of the animal feed mixture. In particular, the animal feed mixture can be transported in a one-part form so that the consumer does not have to accurately mix the animal feed composition and the psyllium composition prior to feeding the animal feed mixture to animals.

Shortly prior to feeding the animal feed composition to ruminants, the animal feed composition is mixed with an effective amount of water to form an animal feed solution. As used herein, the term "effective amount of water" means an amount of water that is sufficient to provide the animal feed solution with a texture that is similar to milk.

It is believed that the animal feed solution displays these advantageous suspension characteristics because of the particle size and the purity of the psyllium composition. The psyllium composition used with the present invention has a lesser purity than psyllium compositions used in prior art feeds, which have a purity of greater than 90 percent and typically about 95 percent. In addition, the psyllium composition used in the present invention has a finer particle size than prior art psyllium compositions where greater than 5 percent is commonly retained on a 20 mesh screen.

The psyllium composition used in the present invention imbibes water much more slowly than the psyllium compositions used in prior art animal feed mixtures. Because the present psyllium composition imbibes water more slowly, the psyllium composition of the present invention remains in suspension for more than 5 minutes and preferably for between 15 and 20 minutes. In addition, the animal feed solution maintains the consistency of a thin gel.

The psyllium compositions used in the prior art animal feed solutions settles to the bottom of a feed container in a thick gelatinous mass in less than 5 minutes. When psyllium imbibes water and then settles out of the animal feed solution, it becomes less likely that the psyllium will be consumed by the animal. Settling of the psyllium changes the texture of the animal feed solution and thereby makes the animal feed solution less palatable to the animal. As a result of the rapid settling of the prior art psyllium compositions, the time within which the animal feed solution must be consumed is limited.

It has been found that when an animal is fed the animal feed solution that is prepared according to the present invention, the animal exhibits a greater weight gain per unit of protein that is consumed than animals that consume an animal feed that does not contain the psyllium composition of the present invention. As a result, the protein concentration in the animal feed solution can be reduced while providing the animal with sufficient protein to gain the same or more weight than animals fed a greater concentration of protein but without the psyllium composition of the present invention.

The method of the present invention is described in the following examples. These examples are provided as an illustration of the invention and are not intended to limit the invention.

EXAMPLE 1

The effectiveness of the animal feed of the present invention was studied using 144 Holstein bull calves. Each of the calves weighed approximately 100 pounds at the beginning of the study. Eighteen calves were assigned to groups based upon initial weight and initial globulin level. In each group there was an approximately equal initial weight average. Each group also contained an equal number of calves with a globulin concentration of less than 1.0 percent by weight in the calf's blood serum.

The weight of each of the calves was monitored weekly during the four week study. The calves were fed milk replacer twice daily and the feedings began at approximately 7:00 and 16:15 each day.

Each of the milk replacers had a fat concentration of approximately 20 percent by weight. The milk replacers were selected to have a protein concentration of either 19, 20, or 22 percent by weight.

The psyllium composition had a purity of approximately 85 percent and a particle size where less than 10 percent of the psyllium composition was retained on a 60 mesh screen and 0 percent was retained on a 20 mesh screen. The psyllium composition was mixed into the milk replacer in the desired amount. For example, where the psyllium feeding rate was 5.0 grams per feeding, 5.0 grams of the psyllium composition was mixed into 0.50 pounds of milk replacer.

Shortly prior to the feeding times, the milk replacer was mixed into water to create a milk replacer solution. The mixed milk replacer solution had a texture that was similar to milk. The consumption of milk replacer by each calf was monitored for each feeding and was the same amount for each calf. Throughout the study it was found that the milk replacer retained the consistency of a thin gel with only minor portions settling in less than 15 minutes.

The results of the four week feeding study are set forth in Table 1. As can be seen from the data, the addition of psyllium to the milk replacer caused an increase in average protein efficiency in almost all instances. Average protein efficiency is pounds gained by the calf divided by the percent crude protein consumed. The addition of psyllium to the milk replacer also caused the calves to experience a greater weight gain at a lower protein concentration when compared to the 22 percent protein milk replacer without psyllium. This indicates that adding the psyllium composition to the milk replacer has a protein sparing effect.

TABLE 1

| Percent Crude Protein | 22 | | 20 | | 19 | | | |
|---|---|---|---|---|---|---|---|---|
| Psyllium per Feeding (grams) | 0 | 5.0 | 5.0 | 0 | 2.5 | 5.0 | 7.5 | 10.0 |
| Average Calf Weight Gain (pounds) | 26.35 | 29.97 | 28.13 | 26.19 | 25.77 | 26.87 | 26.80 | 28.45 |
| Average Protein Efficiency | 1.20 | 1.36 | 1.41 | 1.46 | 1.43 | 1.49 | 1.49 | 1.58 |

EXAMPLE 2

The procedure set forth in Example 1 was repeated with 108 calves to examine the effect of using protein concentration and psyllium concentrations. Six different combinations with 18 calves per combination were used in this example. The first milk replacer had a protein concentration of 18 percent by weight and a psyllium concentration of 0 or 5.0 grams per feeding (0 or 10.0 grams of psyllium per day). The second milk replacer had a protein concentration of 20 percent by weight and a psyllium concentration of 0 or 5.0 grams per feeding (0 or 10.0 grams of psyllium per day). The third milk replacer had a protein concentration of 22 percent by weight and also provided 0 or 5.0 grams of psyllium per feeding (0 or 10.0 grams of psyllium per day).

When the milk replacer was mixed with water to create a milk replacer solution, the milk replacer solution retained the consistency of a thin gel with only minor portions settling in less than 15 minutes.

After feeding the milk replacer solutions to calves for four weeks, it was determined that the average protein efficiency for psyllium containing milk replacer solutions was improved compared with milk replacers not containing psyllium (Table 2). The results from this example also indicate that using the psyllium composition in the milk replacer provides a more efficient use of the protein in the milk replacer. Accordingly, incorporating the psyllium composition into the milk replacer allows the milk replacer to be formulated with a lower protein concentration. By using a lower protein concentration in the milk replacer, the cost of feeding the calves can be reduced.

TABLE 2

| Percent Crude Protein | 22 | | 20 | | 18 | |
|---|---|---|---|---|---|---|
| Psyllium per Feeding (grams) | 0 | 5.0 | 0 | 5.0 | 0 | 5.0 |
| Average Calf Weight Gain (pounds) | 29.88 | 30.27 | 29.86 | 31.24 | 27.62 | 28.44 |
| Average Protein Efficiency | 1.36 | 1.38 | 1.49 | 1.56 | 1.53 | 1.58 |

Although the present invention has been described with reference to preferred embodiments, workers skilled in the art will recognize that changes may be made in form and detail without departing from the spirit and scope of the invention.

What is claimed is:

1. A method of making an animal feed having a stable suspension of psyllium, the method comprising the step of mixing an effective amount of a psyllium composition, an animal feed composition, and water to form an animal feed solution, wherein the psyllium composition remains in suspension for greater than 5 minutes.

2. The method of claim 1 wherein the psyllium composition has a purity of between approximately 84 and 86 percent by weight.

3. The method of claim 2 wherein the psyllium composition is characterized by less than 10 percent of the psyllium composition being retained on a 60 mesh screen and 0 percent of the psyllium composition being retained on a 20 mesh screen.

4. A method of feeding a ruminant, the method comprising the steps of:

mixing an effective amount of a psyllium composition and an animal feed composition into water to form an animal feed solution, wherein the psyllium composition remains in suspension for greater than 5 minutes; and feeding the animal feed solution to the ruminant.

5. The method of claim 4 wherein the psyllium composition has purity of between approximately 84 and 86 percent by weight.

6. The method of claim 5 wherein the psyllium composition is characterized by less than 10 percent of the psyllium composition being retained on a 60 mesh screen and 0 percent of the psyllium composition being retained on a 20 mesh screen.

7. An animal feed mixture that is capable of forming a stable suspension when mixed with water, the animal feed mixture comprising an animal feed composition and an effective amount of a psyllium composition, wherein the psyllium composition remains in suspension for greater than 5 minutes.

8. The animal feed mixture of claim 7 wherein the psyllium composition has a purity of between approximately 84 and 86 percent by weight.

9. The animal feed mixture of claim 8 wherein the psyllium composition is characterized by less than 10 percent of the psyllium composition being retained on a 60 mesh screen and 0 percent of the psyllium composition being retained on a 20 mesh screen.

10. The animal feed mixture of claim 7 wherein the psyllium composition is mixed into the animal feed composition in a concentration of less than approximately 4.4 percent by weight.

11. The animal feed mixture of claim 10 wherein the psyllium composition is mixed into the animal feed composition in a concentration of between approximately 0.5 and 2.2 percent by weight.

12. An animal feed solution, the animal feed solution comprising water, an effective amount of an animal feed composition, and an effective amount of a psyllium composition, wherein the psyllium composition wherein the psyllium composition remains in suspension for greater than 10 minutes.

13. The animal feed solution of claim 12 wherein the psyllium composition has a purity of between approximately 84 and 86 percent by weight.

14. The animal feed solution of claim 13 wherein the psyllium composition is characterized by less than 10 percent of the psyllium composition being retained on a 60 mesh screen and 0 percent of the psyllium composition being retained on a 20 mesh screen.

15. The animal feed solution of claim 12 wherein the psyllium composition is mixed into the animal feed composition in a concentration of less than approximately 4.4 percent by weight.

16. The animal feed solution of claim 15 wherein the psyllium composition is mixed into the animal feed composition in a concentration of between approximately 0.5 and 2.2 percent by weight.

* * * * *

UNITED STATES PATENT AND TRADEMARK OFFICE
CERTIFICATE OF CORRECTION

PATENT NO. : 5,571,542
DATED : NOVEMBER 5, 1996
INVENTOR(S) : BILL L. MILLER, ROBERT DEGREGORIO

It is certified that error appears in the above-indentified patent and that said Letters Patent is hereby corrected as shown below:

Col. 2, line 2, before "Magius", delete "yon", insert --von--

Col. 6, lines 37 and 38, after "composition", delete "wherein the psyllium composition"

Signed and Sealed this

Fourth Day of March, 1997

Attest:

BRUCE LEHMAN

*Attesting Officer*      *Commissioner of Patents and Trademarks*